(12) United States Patent
Daul et al.

(10) Patent No.: US 11,235,686 B2
(45) Date of Patent: Feb. 1, 2022

(54) SEAT RECLINE ASSEMBLY WITH ENERGY ABSORBER

(71) Applicant: ITT MANUFACTURING ENTERPRISES LLC, Wilmington, DE (US)

(72) Inventors: Terrance Daul, Hamburg, NY (US); Jeffrey Kelly, Orchard Park, NY (US)

(73) Assignee: ITT MANUFACTURING ENTERPRIZES LLC, Wilmington, DE (US)

(*) Notice: Subject to any disclaimer, the term of this patent is extended or adjusted under 35 U.S.C. 154(b) by 111 days.

(21) Appl. No.: 16/533,031

(22) Filed: Aug. 6, 2019

(65) Prior Publication Data

US 2021/0039525 A1  Feb. 11, 2021

(51) Int. Cl.
*B60N 2/22* (2006.01)
*A47C 1/024* (2006.01)
*B64D 11/06* (2006.01)

(52) U.S. Cl.
CPC ............ *B60N 2/2227* (2013.01); *A47C 1/024* (2013.01); *B60N 2/2236* (2013.01); *B64D 11/064* (2014.12)

(58) Field of Classification Search
CPC ......... B64D 11/064; B60N 2/22; B60N 2/544
See application file for complete search history.

(56) References Cited

U.S. PATENT DOCUMENTS

| 4,394,047 A * | 7/1983 | Brunelle ............... B60N 2/20 16/339 |
| 5,454,622 A * | 10/1995 | Demopoulos ........ B60N 2/4221 188/374 |
| 5,699,984 A * | 12/1997 | Pinault .................. B64D 11/06 188/371 |
| 6,471,198 B2 * | 10/2002 | Herbst .................... F16F 1/40 188/381 |
| 10,858,109 B2 * | 12/2020 | Hodgkinson ........... B60N 2/42 |
| 2019/0277329 A1 * | 9/2019 | Boyer .................... C25D 7/003 |

* cited by examiner

*Primary Examiner* — Sarah B McPartlin
(74) *Attorney, Agent, or Firm* — Hertzberg, Turk & Associates, LLC

(57) ABSTRACT

Technologies are described for assemblies to recline a seat. The assemblies may comprise a shaft, a threaded end at a first end of the shaft, a Stroke limiter, a seat back mounting, a mounting fastener, an energy absorber, and at least one locknut. A first end of the Stroke limiter may be attached to a second end of the shaft. The seat back mounting may be attached to a second end of the Stroke limiter and the mounting fastener. The energy absorber may be a kinetic energy absorbing element and the shaft may pass through the energy absorber. The locknut may be configured to secure the shaft of the seat recline assembly to the seat frame mounting with the end of the shaft attached to the Stroke limiter on a first side of the seat frame mounting and the energy absorber on a second side of the seat frame mounting.

12 Claims, 3 Drawing Sheets

SEAT RECLINE ASSEMBLY WITH ENERGY ABSORBER

BACKGROUND

Unless otherwise indicated herein, the materials described in this section are not prior art to the claims in this application and are not admitted to be prior art by inclusion in this section.

Airline seats may recline for the comfort and convenience of passengers. An airline seat may include a seat base and a seat back. A recline mechanism of an airline seat may control a positon of the seat back between an upright and reclined position. One end of a seat recline assembly may be mounted to the seat back with a fastener to allow rotation as the seat back reclines. A second end of a seat recline assembly may be mounted to a seat frame and may allow axial translation to adjust the seat back position.

SUMMARY

One embodiment of the invention is a seat recline assembly. The assembly may comprise a shaft with a first end and a second end. The assembly may comprise a threaded end at the first end of the shaft. The assembly may comprise a Stroke limiter. A first end of the Stroke limiter may be attached to the second end of the shaft. The assembly may comprise a body assembly attached to a second end of the Stroke limiter. The assembly may comprise a seat back mounting attached to the body assembly. The assembly may comprise a mounting fastener. The mounting fastener may be configured to attach the seat back mounting to a seat back. The assembly may comprise an energy absorber. The energy absorber may be a kinetic energy absorbing element and the shaft may pass through the energy absorber. The assembly may comprise at least one locknut. The locknut may be configured to secure the shaft of the seat recline assembly to the seat frame mounting with the end of the shaft attached to the Stroke limiter on a first side of the seat frame mounting and the energy absorber on a second side of the seat frame mounting.

Another embodiment of the invention includes a seat recline system. The system may comprise a seat frame. The seat frame may include a seat frame mounting. The system may comprise a seat back and a seat recline assembly. The seat recline assembly may comprise a shaft with a first end and a second end, a threaded end at the first end of the shaft, a Stroke limiter, a body assembly, a seat back mounting, a mounting fastener, an energy absorber, and at least one locknut. A first end of the Stroke limiter may be attached to the second end of the shaft. The body assembly may be attached to a second end of the Stoke limiter. The seat back mounting may be attached to the body assembly. The mounting fastener may attach the seat back mounting to the seat back. The energy absorber may be a kinetic energy absorbing element and the shaft may pass through the energy absorber. The at least one locknut may secure the shaft of the seat recline assembly to the seat frame mounting, with the end of the shaft attached to the Stroke limiter on a first side of the seat frame mounting, and the energy absorber on a second side of the seat frame mounting.

Another embodiment of the invention is a method to assemble a seat recline assembly. The method may comprise attaching a seat back mounting of a seat recline assembly to the seat back with a mounting fastener. The seat recline assembly may include a shaft with a first end and a second end, a threaded end at the first end of the shaft, a Stroke limiter, a body assembly, the seat back mounting, the mounting fastener, an energy absorber, and at least one locknut. A first end of the Stroke limiter may be attached to the second end of the shaft. The body assembly may be attached to a second end of the Stoke limiter. The seat back mounting may be attached to the body assembly. The energy absorber may be a kinetic energy absorbing element and the shaft may pass through the energy absorber. The method may comprise securing the shaft of the seat recline assembly to a seat frame mounting of a seat frame with the at least one locknut, wherein the end of the shaft attached to the Stroke limiter is on a first side of the seat frame mounting, and the energy absorber is on a second side of the seat frame mounting.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
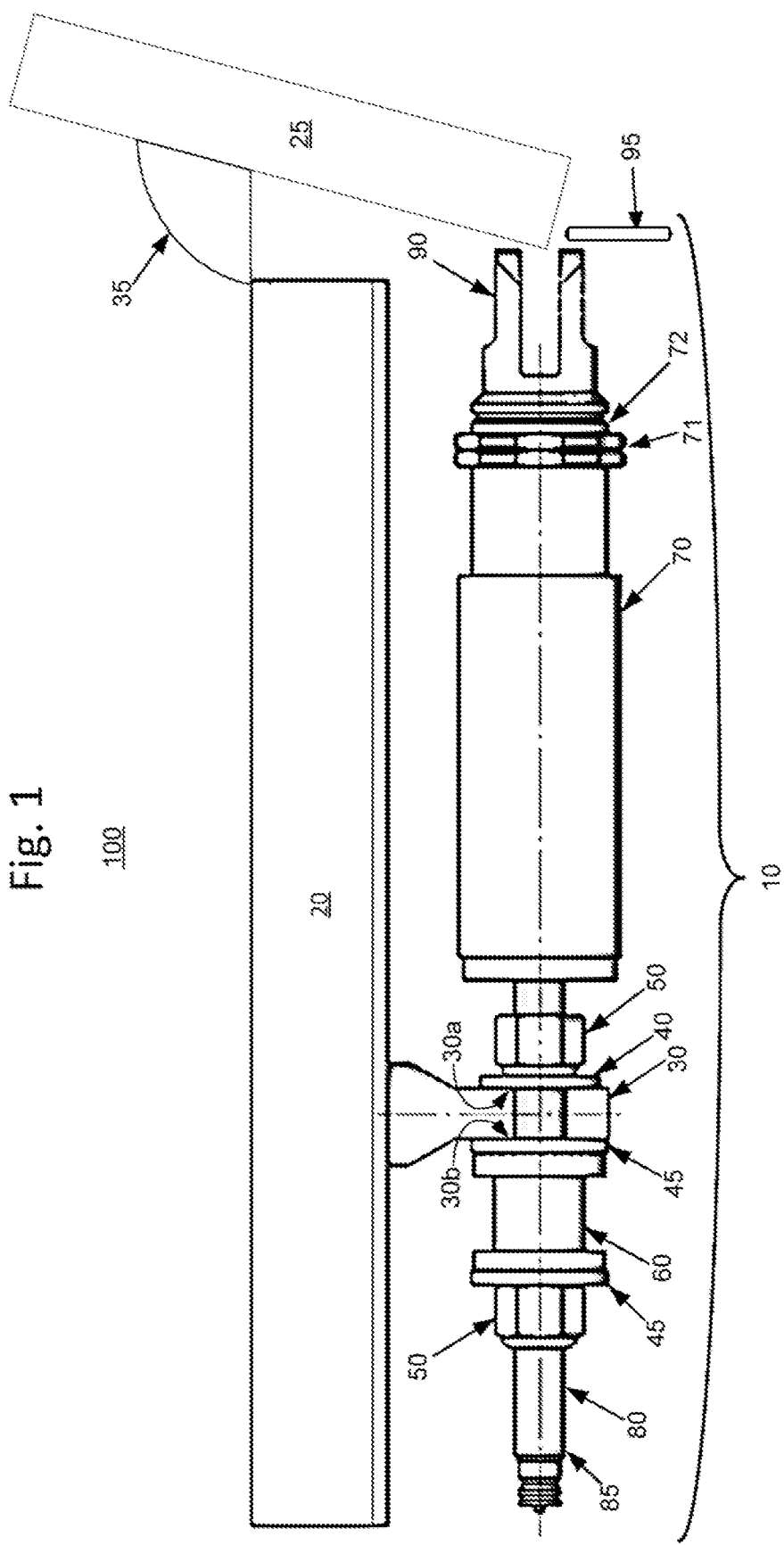
FIG. 1 is a side view of a seat recline system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is side view of a seat recline system, arranged in accordance with at least some embodiments described herein. Seat recline system 100 may include a seat recline assembly 10, a seat frame 20, and a seat back 25. Seat frame 20 may include seat frame mounting 30.

Seat recline assembly may include a seat back mounting 90, a mounting fastener 95, a body assembly 72, stroke adjustment nuts 71, a Stroke limiter 70, a shaft 80, a threaded end 85 of shaft 80, locknuts 50, washers 45, an energy absorber 60, and a washer 40. Threaded end 85 of shaft 80 may be at a first end of shaft 80 and a first end of Stroke limiter 70 may be attached to shaft 80 at a second end of shaft 80. Shaft 80 may pass through locknuts 50, washers 45, energy absorber 60, and washer 40. A first washer 45 may be at a first end of energy absorber 60 and a second washer 45 may be at a second end of energy absorber 60. Washers 45 may be custom sized washers and washer 40 may be a standard size washer. Locknuts 50 may be nylon insert locknuts.

Seat back mounting 90 may be attached to body assembly 72. Mounting fastener 95 may be configured to attach seat back mounting 90 to seat back 25. Mounting fastener 95 may be a pin, a bolt, or any other fastening device.

Energy absorber 60 may be a kinetic energy absorbing element. Energy absorber 60 may be a plastic pipe section and may deform elastically under an applied axial force. Energy absorber 60 may physically deform in shape when a force limit of energy absorber 60 is exceeded. Energy absorber 60 may physically deform in shape when a force limit of 2000 pounds is exceeded. Energy absorber 60 may physically deform by a reduction in a length of energy absorber 60 and an enlargement of a diameter of energy absorber 60 in a bulging manner. Energy absorber 60 may remain physically deformed after a force limit load is removed.

Shaft 80 of seat recline assembly 10 may be attached to seat frame 20 at seat frame mounting 30. Shaft 80 of seat recline assembly 10 may be attached to seat frame 20 on a first side 30a of seat frame mounting 30 by locknut 50 against washer 40. First side 30a of seat frame mounting 30 may be adjacent to second end of shaft 80 attached to Stroke limiter 70. Shaft 80 of seat recline assembly 10 may be attached to seat frame 20 on a second side 30b of seat frame mounting 30 by locknut 50 against a first washer 45, energy absorber 60, and a second washer 45. Second side 30b of seat frame mounting 30 may be adjacent to threaded end 85 at first end of shaft 80.

Seat recline assembly 10 may control an angle of recline 35 between seat frame 20 and seat back 25. Stroke limiter 70 and the stroke adjustment nuts 71 may control the angle of recline 35. A distance between the Stroke limiter 70 and stroke adjustment nuts 71 may be shortened or contracted to decrease angle of incline 35 between seat frame 20 and seat back 25. The distance between the Stroke limiter 70 and stroke adjustment nuts 71 may be increased or expanded to increase angle of incline 35 between seat frame 20 and seat back 25. As shown in more detail below, energy absorber 60 may absorb energy from a force impacting seat back 25.

Figure 2:
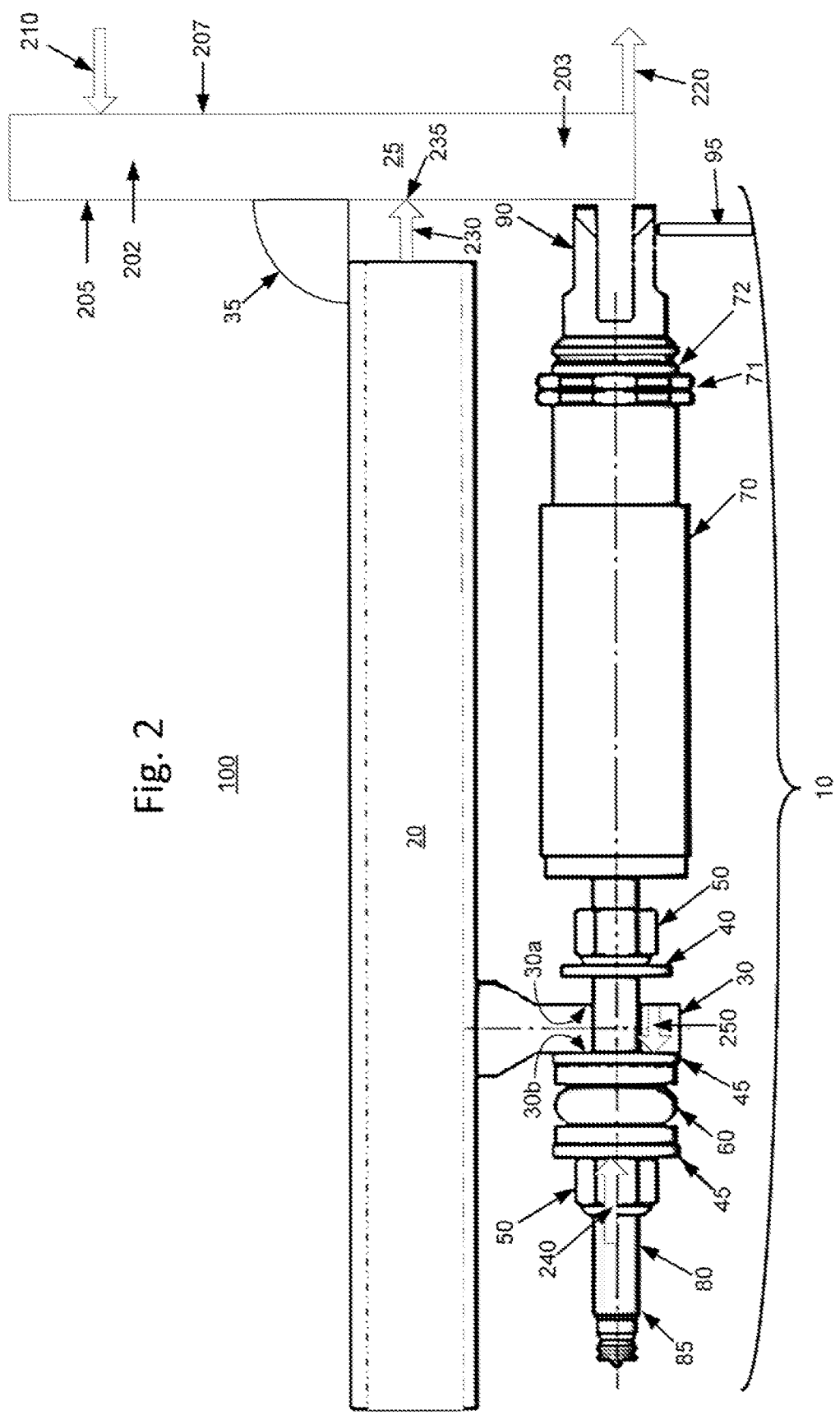
FIG. 2 is a side view of a seat recline system with a force applied to the seat back.

FIG. 2 is a side view of a seat recline system with a force applied to the seat back, arranged in accordance with at least some embodiments described herein. Those components in FIG. 2 that are labeled identically to components of FIG. 1 will not be described again for the purposes of brevity.

Seat back 25 may have a top end 202, a bottom end 203, a front side 205, and a back side 207. A force 210 may be applied to back side 207 of top end 202, of seat back 25. Force 210 may be a force due to an impact against back side 207 of top end 202, of seat back 25. Force 210 may be a force due to an impact of an object or a passenger to seat back 25 due to turbulence, landing, or other flight condition. Seat back 25 may be a rigid structure. Seat frame 20 may be in contact with seat back 25 at a pivot axis 235. Seat frame 20 may act as a fulcrum 230 for seat back 25 at pivot axis 235. Force 210 may drive back side 207 of top end 202 of seat back 25 towards front side 205 of seat back 25.

Seat back 25 may be rigid and force 210 may cause rigid seat back 25 to pivot at pivot axis 235 of fulcrum 230. Force 210 and fulcrum 230, may cause seat back 25 to generate a reactionary force 220, towards back side 207 of seat back 25, at bottom end 203 of seat back 25. Force 220 may be in an opposite direction to force 210. Force 220 at bottom end 203 of seat back 25 may act on recline assembly 10 attached to seat recline assembly 10 at seat back mounting 90. Force 220 acting on recline assembly 10, may apply force 240 on energy absorber 60. Force 240 may be equal to force 220.

Energy absorber 60 may wrap around shaft 80, and shaft 80 may pass through energy absorber 60. Washers 45 may be on both ends of energy absorber 60 and shaft 80 may pass through a first washer 45, energy absorber 60, and a second washer 45. Washers 45 and energy absorber 60 may be secured against seat frame mounting 30 by locknut 50 secured to shaft 80.

Seat frame mounting 30 may be rigid and stationary. In response to force 240 applied to energy absorber 60, seat frame mounting 30 may apply an equal and opposite reactive force 250 to energy absorber 60. Energy absorber 60 between custom washers 45 may compress from force 240 and reactive force 250. Energy absorber 60 may absorb energy from force 240 and reactive force 250 as energy absorber 60 compresses. Recline assembly 10 may move with bottom end 203 of seat back 25 as energy absorber 60 compresses while absorbing force 240 and reactive force 250. Energy absorber 60 of recline assembly 10 may absorb energy from force 220 by absorbing energy from force 240. Energy absorber 60 of recline assembly 10 may absorb energy from force 210 by absorbing energy from force 220. Energy absorber 60 may absorb energy from force 210 due to an impact against back side 207 of top end 202, of seat back 25.

A device in accordance with the present disclosure may allow a recline assembly to absorb the energy of a force from an impact to a back of a top of a seat back. A device in accordance with the present disclosure may prevent injuries due to objects or passengers impacting a seat back during turbulence, landing, or other flight condition. A device in accordance with the present disclosure may allow a seat back to act as an air bag and absorb an impact of a passenger into the back side of the seat back.

Figure 3:
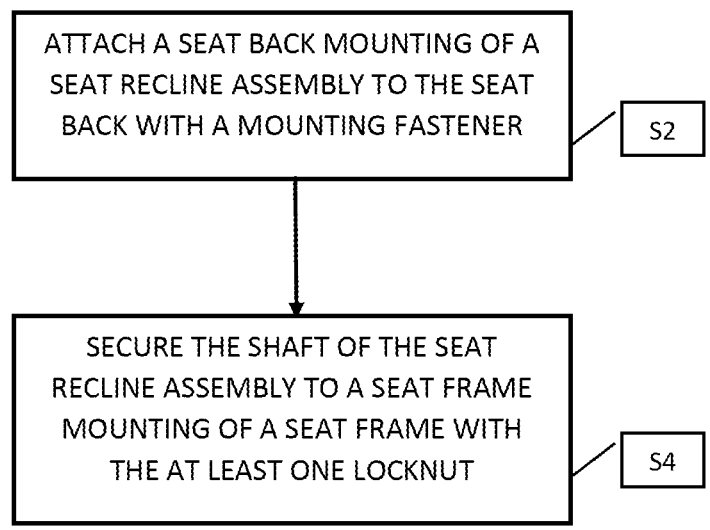
FIG. 3 illustrates a flow diagram for an example process to absorb the energy of an impact to a seat back, all arranged according to at least some embodiments described herein.

FIG. 3 illustrates a flow diagram for an example process to absorb the energy of an impact to a seat back, arranged in accordance with at least some embodiments presented herein. An example process may include one or more operations, actions, or functions as illustrated by one or more of blocks S2, and/or S4. Although illustrated as discrete blocks, various blocks may be divided into additional blocks, combined into fewer blocks, or eliminated, depending on the desired implementation.

Processing may begin at block S2, "ATTACH A SEAT BACK MOUNTING OF A SEAT RECLINE ASSEMBLY TO THE SEAT BACK WITH A MOUNTING FASTENER". At block S2, a seat back mounting of a seat recline assembly is attached to the seat back with a mounting fastener. The seat recline assembly may include a shaft with a first end and a second end, a threaded end at the first end of the shaft, a Stroke limiter, a body assembly, the mounting fastener, an energy absorber, and at least one locknut. A first end of the Stroke limiter may be attached to the second end of the shaft. The body assembly may be attached to a second end of the Stroke limiter. The seat back mounting may be attached to the body assembly. The energy absorber may be a kinetic energy absorbing element. The shaft may pass through the energy absorber.

Processing may continue from block S2 to block S4, "SECURE THE SHAFT OF THE SEAT RECLINE ASSEMBLY TO A SEAT FRAME MOUNTING OF A SEAT FRAME WITH THE AT LEAST ONE LOCKNUT". At block S4, the shaft of the seat recline assembly may be secured to a seat frame mounting of a seat frame with at least one locknut. The end of the shaft attached to the Stroke limiter may be on a first side of the seat frame mounting and the energy absorber may be one a second side of the seat frame mounting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A seat recline assembly to control a position of a seat back relative to a seat frame between an upright and a reclined position, the assembly comprising:
   a shaft with a first end and a second end;
   a threaded end at the first end of the shaft;
   a stroke limiter, wherein a first end of the stroke limiter is attached to the second end of the shaft;
   a body assembly attached to a second end of the stroke limiter in axial alignment with the shaft;
   a seat back mounting configured to couple to the seat back and attached to the body assembly in axial alignment with the shaft;
   a mounting fastener, wherein the mounting fastener is configured to attach the seat back mounting to a seat back;
   an energy absorber, wherein the energy absorber is a kinetic energy absorbing element, is physically deformed from a first shape to a second, physically deformed shape in response to an axial force limit load application, remains in the second physically deformed shape after the force limit load is removed, and the shaft passes through the energy absorber;
   a seat frame mounting attached to an underside of a seat frame and in perpendicular alignment with the shaft, wherein
      a lower portion of the seat frame mounting is configured for the shaft to pass through, and
      the stroke limiter is attached to the shaft on a first side of the seat frame mounting and the energy absorber on a second side of the seat frame mounting; and
   at least one locknut, wherein the at least one locknut is configured to secure the shaft of the seat recline assembly to the seat frame mounting.

2. The seat recline assembly of claim 1, further comprising a first washer on a first side of the energy absorber and a second washer on a second side of the energy absorber, wherein the shaft passes through the first washer, the energy absorber, and the second washer.

3. The seat recline assembly of claim 1, wherein the energy absorber is a plastic pipe section and deforms elastically under an applied axial force.

4. The seat recline assembly of claim 1, wherein the energy absorber physically deforms from the first shape to the second shape with a reduction in a length of the energy absorber and an enlargement of a diameter of the energy absorber in a bulging manner.

5. The seat recline assembly of claim 1, wherein the at least one locknut is a nylon insert locknut.

6. The seat recline assembly of claim 1, wherein:
   the fastener is one of a pin or a bolt.

7. A seat recline system, the system comprising:
   a seat frame, wherein the seat frame includes a seat frame mounting;
   a seat back, wherein a position of the seat back is adjustable relative to the seat frame between an upright and a reclined position; and
   a seat recline assembly, the seat recline assembly comprising:
      a shaft with a first end and a second end;
      a threaded end at the first end of the shaft;
      a stroke limiter, wherein a first end of the stroke limiter is attached to the second end of the shaft;
      a body assembly attached to a second end of the stroke limiter in axial alignment with the shaft;
      a seat back mounting configured to couple to the seat back and attached to the body assembly in axial alignment with the shaft;
      a mounting fastener, wherein the mounting fastener attaches the seat backmounting to the seat back, the seat frame mounting is attached to an underside of the seat frame and in perpendicular alignment with the shaft, a lower portion of the seat frame mounting is configured for the shaft to pass through, and the stroke limiter is attached to the shaft on a first side of the seat frame mounting and the energy absorber on a second side of the seat frame mounting;
      an energy absorber, wherein the energy absorber is a kinetic energy absorbing element, is physically deformed from a first shape to a second, physically deformed shape in response to an axial force limit load application, remains in the second physically deformed shape after the force limit load is removed, and the shaft passes through the energy absorber; and
      at least one locknut, wherein the at least one locknut secures the shaft of the seat recline assembly to the seat frame mounting.

8. The seat recline system of claim 7, further comprising a first washer on a first side of the energy absorber and a second washer on a second side of the energy absorber, wherein the shaft passes through the first washer, the energy absorber, and the second washer.

9. The seat recline system of claim 7, wherein the energy absorber is a plastic pipe section and deforms elastically under an applied axial force.

10. The seat recline system of claim 7, wherein the energy absorber physically deforms from the first shape to the second shape with a reduction in a length of the energy absorber and an enlargement of a diameter of the energy absorber in a bulging manner.

11. The seat recline system of claim 7, wherein the at least one locknut is a nylon insert locknut.

12. The seat recline system of claim 7, wherein:
   the fastener is one of a pin or a bolt.

* * * * *